(12) United States Patent
Koshy et al.

(10) Patent No.: US 12,375,738 B2
(45) Date of Patent: Jul. 29, 2025

(54) DELIVERY OF FOVEATED RENDERING STREAMS FOR MEDIA CONTENT DELIVERY

(71) Applicant: Adeia Guides Inc., San Jose, CA (US)

(72) Inventors: Kamal J. Koshy, Aurora, CO (US); Dhananjay Lal, Englewood, CO (US)

(73) Assignee: Adeia Guides Inc., San Jose, CA (US)

( * ) Notice: Subject to any disclaimer, the term of this patent is extended or adjusted under 35 U.S.C. 154(b) by 33 days.

(21) Appl. No.: 18/200,784

(22) Filed: May 23, 2023

(65) Prior Publication Data
US 2024/0397124 A1    Nov. 28, 2024

(51) Int. Cl.
*H04N 21/2343*    (2011.01)
*H04N 21/2662*    (2011.01)

(52) U.S. Cl.
CPC ..... *H04N 21/2343* (2013.01); *H04N 21/2662* (2013.01)

(58) Field of Classification Search
CPC ........................ H04N 21/2343; H04N 21/2662
See application file for complete search history.

(56) References Cited

U.S. PATENT DOCUMENTS

| | | | |
|---|---|---|---|
| 2018/0192058 A1* | 7/2018 | Chen | H04N 19/17 |
| 2018/0359189 A1* | 12/2018 | Ye | H04N 21/234327 |
| 2020/0128105 A1 | 4/2020 | Liu et al. | |
| 2021/0089119 A1 | 3/2021 | Riguer et al. | |
| 2021/0321286 A1* | 10/2021 | Berliner | H04N 21/2383 |
| 2021/0409999 A1 | 12/2021 | Chilla et al. | |
| 2022/0103907 A1* | 3/2022 | Li | H04N 21/234381 |
| 2022/0113795 A1* | 4/2022 | Eder | G06T 7/11 |

(Continued)

FOREIGN PATENT DOCUMENTS

| | | |
|---|---|---|
| EP | 1919154 A1 | 5/2008 |
| WO | 2018006771 A1 | 1/2018 |

(Continued)

OTHER PUBLICATIONS

"5G NR Modulation and Coding Scheme—Modulation and Code Rate," CableFree Networks, [retrieved from URL: https://www.5g-networks.net/5g-technology/5g-nr-modulation-and-coding-scheme-modulation-and-code-rate/], (5 pages), (2020).

(Continued)

*Primary Examiner* — Randy A Flynn
(74) *Attorney, Agent, or Firm* — Haley Guiliano LLP

(57) ABSTRACT

Methods and systems are described for improved delivery of foveated rendering streams for media content delivery. Received video data is separated into a high acuity (HA) stream and a low acuity (LA) stream. The HA stream is marked to indicate HA transmission. A communication device that retransmits the HA stream based on the marking transmits the HA stream at a lower latency and a higher reliability than the LA stream. A receiving device receives the HA stream and the LA stream. A display device generates for display a combined stream including the HA stream and the LA stream. Artificial intelligence systems, including neural networks, are trained for improving the foveated rendering. Models are developed for the foveated rendering. Related apparatuses, devices, techniques, and articles are also described.

10 Claims, 6 Drawing Sheets

(56) References Cited

U.S. PATENT DOCUMENTS

2023/0199547 A1* 6/2023 Berger .................. H04L 1/0009
370/252

FOREIGN PATENT DOCUMENTS

WO 2018125579 A1 7/2018
WO 2021053644 A1 3/2021

OTHER PUBLICATIONS

"Configuring Wi-Fi Multimedia", Cisco, [retrieved from URL: https://www.cisco.com/assets/sol/sb/RV180W_Emulators/RV180W_Emulator_v1.0.3.14/help/en_US/wireless06.htm] (1 page).

"DSCP and Precedence Values", Cisco Nexus 1000V Quality of Service Configuration Guide, Chapter 6, (2 pages), (2016).

"Foveated Imaging," Wikipedia, (4 pages), (2020).

"Link Adaption," ScienceDirect, [retrieved from URL: https://www.sciencedirect.com/topics/computer-science/link-adaptation], (7 pages), (2023).

"Meraki Traffic Shaper, Datasheet," Cisco Meraki, [retrieved from URL: https://meraki.cisco.com/lib/pdf/meraki_datasheet_traffic_shaper.pdf], (2 pages), (2010).

Bastani, B., "Introducing a New Foveation Pipeline for Virtual/Mixed Reality," [retrieved from URL: https://ai.googleblog.com/2017/12/introducing-new-foveation-pipeline-for.html] (2017), (8 pages).

Bastani, B., et al., "Foveated Pipeline for AR/VR Head-Mounted Displays," Information Display, 33(6):14-35 (2017).

Belogaev, A., et al., "Conservative Link Adaptation for Ultra Reliable Low Latency Communications," 2019 IEEE International Black Sea Conference on Communications and Networking, 1-5 (2019).

Boger, Y., "Understanding Pixel Density & Retinal Resolution, and Why It's Important for AR/VR," [retrieved from URL: https://www.roadtovr.com/understanding-pixel-density-retinal-resolution-and-why-its-important-for-vr-and-ar-headsets/], 1-6 (2017).

Fear, A., "Smooth Operator: GeForce NOW Recommended Routers Optimize Cloud Gaming Experience," [retrieved from URL: https://blogs.nvidia.com/blog/2018/12/19/geforce-now-recommended-routers/], 1-22 (2018).

Khan, J., et al., "Link Adaptation for Multi-connectivity Enabled 5G URLLC: Challenges and Solutions," 2021 International Conference on Communication Systems & Networks (COMSNETS), 148-152 (2021).

Mathuranathan, V., "MPSK modulation: simulate in Matlab & Python," GaussianWaves, 1-15 (2012).

Meng, Z., et al., "Achieving Consistent Low Latency for Wireless Real-Time Communcations with the Shortest Control Loop," SIGCOMM, 1-14 (2022).

Mohanto, B., et al., "Computers & Graphics," Computers & Graphics, 102:474-501 (2022).

Olmos, J., et al., "On the Definition of Reference Scenarios for LTE-A Link Level Simulations within Cost IC1004," UPC, 1-19 (2013).

Paradisi, A., et al., "Long Term Evolution—4G and Beyond," partial (25 pages), (2016).

Raaen, "Visualization of Airtime with a WiFi AirTime Calculator," [retrieved from URL: https://d2cpnw0u24fjm4.cloudfront.net/wp-content/uploads/Gjermund-Raaen_Visualization-of-Airtime.pdf], (23 pages).

Raaen, G., "The Legacy Length-field vs the WiFi AirTime Calculator on 802.11ax Aggregated Frames," [retrieved from URL: https://gjermundraaen.com/2020/02/17/the-legacy-length-field-vs-the-wifi-airtime-calculator-on-802-11ax-aggregated-frames/], (6 pages), (2020).

Romero-Rondón, M. F., et al., "Foveated streaming of virtual reality videos," MMSys '18: Proceedings of the 9th ACM Multimedia Systems Conference, 494-497 (2018).

"Interframe Space Basics," Wait, but Wi-Fi? [retrieved from URL: https://waitbutwifi.com/interframe-space-basics/] (8 pages), (2019).

Vergès, F., "MCS Table (Updated With 802.11AX Data Rates," SemFio Networks, [retrieved from URL: https://semfionetworks.com/blog/mcs-table-updated-with-80211ax-data-rates/] (13 pages), (2019).

Perfecto, C., et al. "Taming the latency in multi-user VR 360°: A QoE-aware deep learning-aided multicast framework." IEEE Transactions on Communications 68.4 (2020): 2491-2508.

Paradisi, Alberto, et al., eds., Long Term Evolution: 4G and Beyond, Chapter 6, "Link Adaptation in LTE Systems," Ricardo Toguchi Caldeira and Gilberto Gambugge Neto, pp. 103-112, Springer, 2015.

Hsiao L., et al., "Towards retina-quality VR video streaming", ACM SIGCOMM Computer Communication Review, 52 (1): 10-19 (Jan. 1, 2022).

* cited by examiner

DELIVERY OF FOVEATED RENDERING STREAMS FOR MEDIA CONTENT DELIVERY

FIELD OF THE INVENTION

The present disclosure relates to image and video rendering. Foveated rendering is provided for audiovisual media. The audiovisual media includes extended reality (XR) sessions including XR, augmented reality (AR), three-dimensional (3D) content, four-dimensional (4D) experiences, next-generation user interfaces (next-gen UIs), virtual reality (VR), mixed reality (MR) experiences, interactive experiences, and the like.

SUMMARY

AR/VR headsets provide an increasingly popular avenue for entertainment for users. Wireless head-mounted displays (HMDs) provide for an untethered experience. Such headsets create an immersive experience in the AR/VR world. The present methods and systems include improved approaches to image and/or video rendering, including foveated rendering, on such devices. The foveated rendering includes approaches to transmission of a plurality of streams derived using foveation techniques from an edge server to such devices. In some embodiments, foveated rendering utilizes eye tracking and/or a fixed focal point, and the foveated rendering is integrated with an AR/VR headset to reduce a rendering workload by reducing image quality in a peripheral area (e.g., an area outside of a gaze based on the eye tracking and/or outside the fixed focal point). The present methods and systems include improved classification, input analysis, prioritization, processing, routing, reliability assurance, combining, displaying, network communication techniques, and the like. The present methods and systems result in improved reliability, latency, jitter, bandwidth consumption, displayed content quality, and overall user experience.

Foveated rendering is improved by separating traffic and/or a stream into classes based on identification of at least a high acuity (HA) region. The separating occurs, in some embodiments, at an edge server configured therefor. In some embodiments, additional regions such as a low acuity (LA) region are identified. The identification may be based on user gaze or any other suitable parameter. In some embodiments, traffic is separated into classes based on one or more locations where relevant movement and/or changes in user play occur. In some embodiments the location where relevant movement and/or changes in user play occur are identified by the user gaze or other suitable parameters. Various inputs (e.g., gaze recognition, facial recognition, mouse, pointers, and the like) are used to separate and/or identify traffic into classes for display devices. Identified classes of traffic for HA and LA regions are marked or tagged, for example, with Differentiated Services Code Point (DSCP) and/or Internet Protocol (IP) precedence. HA traffic is prioritized and/or processed over a network. An edge server is provided for prioritization and processing. A reliability of the HA traffic is increased on a transmitter (e.g., a router) configured therefor. In some embodiments, the edge server identifies the HA region in a media frame and renders the HA and LA streams separately. A modulation coding scheme (MCS) is used to increase reliability of the HA traffic on the router configured therefor. In some embodiments, the router is physically located in a premises of the user. Resource blocks are used to increase reliability of the HA traffic on the router configured therefor. Traffic streams are combined at a user-side device, such as an HMD, configured therefor. HA and LA parameters are communicated to the router by a communication device, such as a transmitting device or a wireless router, configured therefor. Redundancy of HA traffic is dynamically increased based on network conditions. A queue with higher priority in Wi-Fi Multimedia (WMM) is applied to high resolution foveal content. MCS and WMM modulation are applied based on addresses and/or port numbers when DSCP code points are bleached by the network, so that the HA streams are highly reliable.

The present invention is not limited to the combination of the elements as listed herein and may be assembled in any combination of the elements described herein.

These and other capabilities of the disclosed subject matter will be more fully understood after a review of the following figures, detailed description, and claims.

BRIEF DESCRIPTIONS OF THE DRAWINGS

The present disclosure, in accordance with one or more various embodiments, is described in detail with reference to the following figures. The drawings are provided for purposes of illustration only and merely depict non-limiting examples and embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The embodiments herein may be better understood by referring to the following description in conjunction with the accompanying drawings, in which like reference numerals indicate identical or functionally similar elements, and in which.

Figure 1:
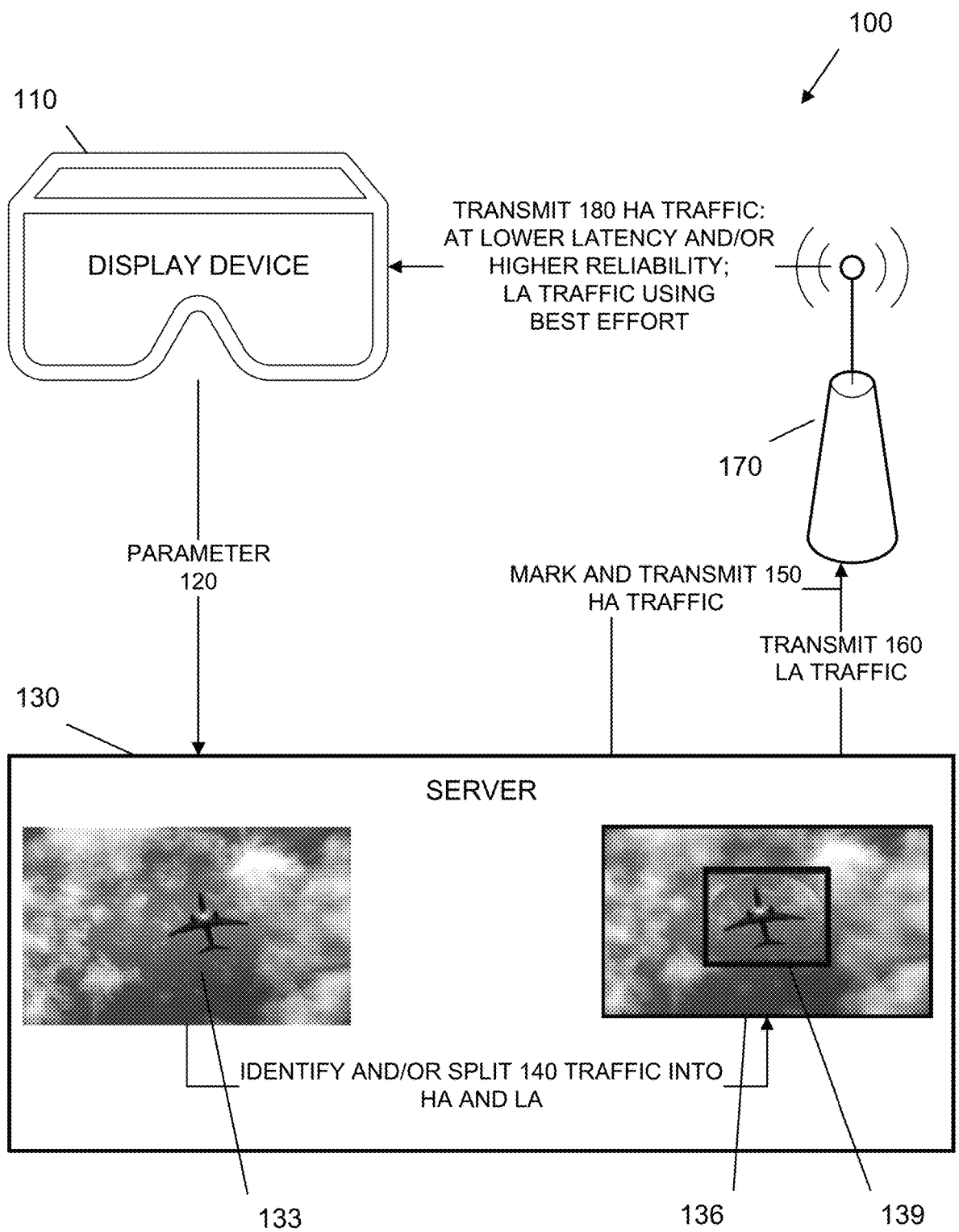
FIG. 1 depicts a system including an edge server, in accordance with some embodiments of the disclosure.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting embodiments and that the scope of the present invention is defined solely by the claims.

DETAILED DESCRIPTION

Image and/or video rendering, including foveated rendering, is delivered by separating received video traffic into classes, marking a highest-priority of the separated classes, transmitting the highest-priority class at a relatively low latency, and displaying the combined traffic. The marking includes tagging or modifying a header of a packet, and addressing the highest-priority class to a specific port or address. The relatively low latency transmitting includes transmitting the highest-priority class at a relatively high ratio of redundancy, and a relatively low retransmission rate. Additional processes for reducing latency are provided. The separated classes may include at least a high acuity (HA) stream. Additional non-HA streams, such as a low acuity (LA) stream alone or the LA stream and a medium acuity (MA) stream, or any suitable number or type of non-HA streams, are provided.

Foveated rendering refers to an area of an image or video of highest acuity. A foveal region corresponds in a biological sense to a relatively small depression in a retina of a human viewer where cones are present and vision is most acute. However, the term is not intended to be limited to such. That is, when the term "foveated rendering" and the like are used, other areas or regions of interest (aside from the foveal region) may be a target for HA rendering.

Classified traffic is prioritized utilizing packet classification. An edge server prioritizes, sends, and processes the HA traffic. A router is optimized for and increases the reliability of the HA traffic. The router includes at least one of an MCS, additional resource blocks, or modified transmit parameters to increase the reliability of the HA traffic. An HMD combines the traffic streams for display. Redundancy of HA traffic is dynamically modified based on network conditions. WMM is applied to generate high resolution foveal content. The MCS and WMM are modified based on port numbers.

Overall latency and jitter for images displayed in a headset for HA regions in foveated imaging are reduced. In order to compensate for additional transmission time, additional resource blocks are added and/or block error rate (BLER) is reduced for LA data.

The reliability of the HA part of the foveated image is adaptively increased using wireless techniques. In some embodiments, based on the user gaze, a section of the image is classified as HA and the other sections are classified as, for example, MA or LA. Based on the image area classification, the reliability of the wireless link is automatically modified when sent from the server. Automatic modification is achieved using mechanisms like DSCP tagging. DSCP tagging includes marking the relevant bits in an IP4/IPv6 header. The DSCP code point is inserted in the type-of-service (ToS) byte in the IP header.

In some embodiments, gaze determination is performed in accordance with one or embodiments of U.S. Pat. No. 8,854,447, titled, "Systems and Methods for Automatically Adjusting Audio Based on Gaze Point," issued Oct. 7, 2014, to Conness, et al., which is hereby incorporated by reference herein in its entirety. Also, pupil and/or eye tracking is provided in accordance with one or embodiments of U.S. Pat. No. 11,320,903, titled "Methods and Systems of Extended Reality Environment Interaction Based on Eye Motions," issued May 3, 2022, to Aher et al., which is hereby incorporated by reference herein in its entirety. Further, pose and/or posture tracking is provided in accordance with one or embodiments of U.S. patent application Ser. No. 17/752,311, titled, "Systems and Methods for Recommending Content Items Based on an Identified Posture," filed May 24, 2022, to Dutta et al., which is hereby incorporated by reference herein in its entirety.

In embodiments including a router, the DSCP tagging in the incoming traffic is used to adaptively modify the transmit conditions to the AR/VR headset. The tagging that corresponds to high reliability and/or low reliability traffic is pre-determined and programmed into the router. Once the router receives the IP packets with DSCP tagging, the router modifies the transmit parameters (modulation—for example, binary phase-shift keying (BPSK), quadrature phase-shift keying (QPSK), and the like, and coding—for example—½, ¾, ⅞, and the like) to the transmit sequence to modify the reliability of the traffic sent to the headset.

As an example, the HA regions may be sent by the router at QPSK modulation and a coding rate of ½ since it will provide for a BLER of less than about 1% for a current signal-to-noise ratio. The LA regions may however be sent at 64-quadrature amplitude modulation (QAM) and a coding rate of ¾, since it will provide for BLER of less than about 10%. Using this adaptive mechanism, the HA regions are sent to the HMD with high reliability, while the LA regions are sent with lower reliability.

FIG. 1 depicts an overview of a system 100 for reliable wireless communication for HA regions. In some embodiments, the system 100 includes a display device 110, such as an HMD. At least one parameter 120 is detected at the display device 110 or output from the display device 110. The parameter 120 may be at least one of a gaze of the user of the display device 110, a user location in an extended reality space associated with the video data, a user movement in an extended reality space associated with the video data, a change in play in an extended reality space associated with the video data, a signal from a user-operated input device, or the like. In some embodiments, the parameter is at least one of the user location, the user movement, or the change in play in the XR space associated with the video data. In some embodiments, the parameter drives a user's field of view and forms the basis for the identification of the HA region. In some embodiments, the change in play corresponds to the signal from the user-operated input device, such as a press of a button or directional change on a game controller, and forms the basis for the identification of the HA region.

The system 100 includes a server 130, which, in some embodiments, is an edge server. The server 130 is configured to identify and/or split 140 traffic from the display device 110. The traffic is split into HA and LA regions in some embodiments. The identifying and/or splitting 140 is not limited to two regions, i.e., HA and LA. One or more additional MA regions may be identified and/or split from the traffic. The parameter 120 may be the basis for the identifying and/or splitting 140. In an example, the server 130 receives an original image 133 from a suitable source, such as a gaming engine. On the basis of the parameter 120, an HA region 139 and an LA region 136 of the original region 133 are identified. The HA region 139 is tagged and transmitted 150. The LA region 136 is transmitted 160.

In some embodiments, the tagged HA traffic is transmitted from the server 130 to a communication device 170, and the LA traffic is separately transmitted from the server 130 to the communication device 170. In some embodiments, the communication device 170 is at least one of a router, a wireless router, a switch, a hub, an access point, or the like. In one example, a multilayer switch, such as a layer 3 switch, operated in accordance with an IP routing table is provided. In some embodiments, the server 130 and the communication device 170 are communicatively coupled via an Internet connection or other suitable form of communication network.

In some embodiments, the HA traffic is transmitted 180 from the communication device 170 to the display device 110. The transmitting 180 may include transmission of the HA traffic at a lower latency and/or a higher reliability, and transmission of the LA traffic using best effort. In some embodiments, lower aggregate latency is provided across all packets within the HA stream, and higher aggregate latency within the LA stream.

Although FIG. 1 depicts the display device 110, the server 130, and the communication device 170 as separate units, it is understood that one or more functions of the display device 110, the server 130, and the communication device 170 may be combined or separated in any suitable combination. For instance, in one example, an HMD incorporates the display device 110 and the communication device 170.

In some embodiments, the display device 110 is configured to perform at least one of combining HA and LA traffic, distortion correction, lighting correction, or blending.

Desirable pixel density is achieved, in some embodiments, with AR/VR headsets using a combination of foveated imaging, link adaptation, and long-term evolution (LTE). With foveated imaging, a parameter (such as a user's gaze) may be directed to a section of an image, which is rendered at a relatively high resolution, while peripheral sections are displayed at a lower resolution. Foveated imaging reduces a need to perform image compression on an entire image thus reducing processing and bandwidth requirements. Foveated imaging is provided in a manner that improves an accuracy of detection of a parameter (e.g., gaze) and an accuracy of image determination. Improvements to gaming engines and AR/VR headsets are provided that update an area of relevance within an image without unduly burdening processing.

Communication protocols are provided for wireless HMDs. In some embodiments, the communication protocols for wireless HMDs include application to local area networks and fifth generation (5G) protocols. Since wireless communication is inherently an unreliable medium, communication protocols are provided to enhance a reliability of transmission. The present approaches are adaptable to changes in wireless channels over time. Improved wireless transmitters and receivers for channel changes are provided to compensate for these changes over time, and to maintain a sufficient data rate of transmission.

Improved link adaptation is provided. In wireless communications, with any link adaptation technique, in order to avoid errors in transmission, some blocks are retransmitted via a data link layer, e.g., medium access control (MAC) Layer 2. The present approaches improve latency in wireless networks. In some embodiments, end-to-end latency of about 90% of packets is achieved and considered within an acceptable range. Such latency is provided without a significant heavy tail of delay. In some approaches, a heavy tail is reduced or eliminated, for example, by avoiding retransmissions at the MAC Layer 2. The wireless technologies are tuned to transmit at a highest possible rate while maintaining a reasonable BLER to maintain a link with a highest capacity.

At a particular error rate value, different modulation schemes (and also coding rates) have different symbol error rates. In one approach, reliability of a wireless link is improved by reducing the BLER without reducing a total capacity of the link. Also in some approaches, communication link adaptation sends a highest data rate for a certain symbol (or BLER).

Modulation in communication technology refers to a number of bits that are transmitted in a single unit (also called subcarrier in frequency domain and part of a symbol in time domain). Modulation is provided in LTE, Wi-Fi, 5G, and the like, as BPSK, QPSK, 16-QAM, 64-QAM, and the like. The number of bits transmitted for 16-QAM is 4, while for 64-QAM the number of bits transmitted is 6 (logarithm to base 2).

In communication technology, redundancy is added to data to be transmitted. The additional redundancy allows a receiver to decode a signal without errors. A coding rate refers to the additional redundancy added, and coding rates are expressed as fractions less than 1. For example, a three-quarters (¾) coding rate means that ¾ of the transmitted data is actual data and one-quarter (¼) is redundant information.

Depending on channel conditions, a combination of modulation and coding rates is modified to transmit data reliably. This combination is referred to as a Modulation Coding Scheme (MCS). In some embodiments, MCS is applied to traffic on a router configured for foveated rendering.

A foveated imaging pipeline is provided. In some embodiments, foveated imaging pipelines are run separately and merged together in a headset device, which reduces overall power consumption in the headset device. The foveated pipeline is applied to specific end user applications including VR and AR headsets.

Reductions in latency and jitter in AR/VR are provided and applied, in some embodiments, to unicast transmission.

Ultra-reliable low latency communication (URLLC) in 5G is provided to enhance link reliability with conservative link adaptation and without compromising link data rate.

In some embodiments, foveated rendering is achieved at a relatively high latency requirement of, for example, about 20 ms to about 40 ms.

In another approach, foveated content is transmitted frequently, while low-resolution content is sent at a start of a session. In some embodiments, emission of frames may be pipelined before completion of a segment.

In some embodiments, in the context of foveated rendering, network analysis systems detect flow and mark a DSCP code point on network ingress for treatment within the network.

In an approach, Wi-Fi transmission with a small amount of data takes about 200 microseconds to about 400 microseconds depending on a link data rate. The Wi-Fi router aggregates traffic from multiple flows before transmitting without additional latency.

To achieve a lower BLER of, for example, about 0.01 instead of about 0.1, a transmitter is configured to change the MCS level by one to two steps. Reduction in MCS levels contributes to an increase of about 15% to about 20% in the overall transmission time, while reducing the BLER significantly. The change in MCS level reduces the probability of the jitter caused by Layer 2 retransmissions (multiple milliseconds) from about 10% to about 1% with some increase in data rate.

Related to the system 100 of FIG. 1, six sections follow below (numbered 1 to 6, inclusive), which comprise detailed discussions of communication of a user state to a server, separation of content generation into HA and LA regions, an encoder, application of network communication to a router, router-to-headset communication, and processing at HMDs. The system 100 may include enhancements based on at least one of the six sections that follow.

1. Communication of a User State to a Server

In some embodiments, the system 100 includes an HMD configured to communicate with an edge server, which hosts a user session. The information communicated includes a state of a session and information about a current location of a user's gaze. Alternatively or in addition, a determination of important actions and/or movements in the displayed image is made, and a relevant section of a displayed image is identified based on the determined important actions and/or movements.

2. Separation of Content Generation into HA and LA Regions

In the example scenario shown in FIG. 1, the system 100 is configured to use information about the parameter (e.g., user's gaze) to separate an image into HA and LA regions. This separation into HA and LA regions is used to change end-to-end network communication parameters. The end-to-end network communication parameters are tuned to requirements for both HA and LA image segments. In some embodiments, separation into HA, MA, and LA regions is provided.

3. Encoder

An encoder is provided. In some embodiments, the encoder is provided with the server 130. HA and LA regions are encoded separately. Separation of HA and LA regions is required to apply different network parameters to the content.

4. Application of Network Communication to a Router

In some embodiments, network communication to the communication device 170 (e.g., a router) utilizes Internet protocols. The Internet protocols include use of TCP/IP or User Datagram Protocol (UDP) for Layer 3 and/or Layer 4 transport layer protocols. In addition, in some embodiments, communication with an application layer protocol like RTP with TCP/UDP as the transport protocol is utilized. In some embodiments, IPv6 is used as the network layer protocol instead of IPv4. Additional information from the separation of traffic into HA and LA regions is used to tag the traffic with different priority levels. The traffic is tagged with Differentiated Services Code Point (DSCP) or IP precedence fields in the header. The traffic for HA regions is marked with critical or high priority traffic tags, and the LA region traffic is marked with best effort tags.

In some embodiments, an HA region is sent as a different DSCP stream separate from an LA region. Buffering is reduced or eliminated. Source and master tags are assigned. An IP header may include differentiated services, a type of service, and information associated with the tagged HA region.

In approaches where header tags are removed, DSCP port numbers may be utilized for the HA regions. Source and destination ports may be designated. With a cloud controller for a WiFi system, a different destination address is marked through the cloud controller.

In some embodiments, DSCP port numbers are redundant such that, if header tagging does not work, then destination ports are utilized.

The output from the encoder has separate high-resolution and low-resolution streams, and this information is used to adaptively tag the streams with the correct DSCP tagging for network priority. When the transport protocol is UDP, this tagging is achieved by using separate sender and destination ports for HA and LA traffic.

5. Router-to-Headset Communication

After the communication device 170 (e.g., the router) receives the downstream traffic, before transmission to the HMD, the router is configured to use information from DSCP and IP precedence header fields to segment traffic. Three sub-sections follow (numbered 5.A to 5.C, inclusive), which describe mechanisms used to adapt communication techniques corresponding to requirements for the different regions (e.g., LA and HA), i.e., MCS adaptation for higher reliability and lower jitter for HA data, use with WMM, and removal of DSCP tags by intermediate routers.

5.A. MCS Adaptation for Higher Reliability and Lower Jitter for HA Data

Link adaptation results in about 10% BLERs. For retransmitted blocks in Layer 2 for Wi-Fi, the additional latency introduced is on the order of multiple round-trip delays (i.e., transmission delay to device, a negative-acknowledgement (NACK) or fail to receive acknowledgement (ACK) from the HMD, processing time to encapsulate information to the HMD, re-transmission delay, and the like). In addition, in many cases, if the wireless medium is busy, then the transmitter must wait for additional backoff time before retransmission. Taking five times round trip delay as an average case, a latency of about two milliseconds is added for blocks that must be retransmitted.

To compensate for packet loss, an MCS adaption technique is applied to the HA traffic. A system is configured to achieve improved performance. The system combines, for example, foveated rendering, HA and LA tagging, changing MCS, BSCP tagging, and WMM. In some embodiments, LA regions are sacrificed while prioritizing HA regions. In some embodiments, HA regions are tagged, and step-down MCS is applied to the tagged HA regions. The wireless router and/or base station reduces a coding rate and modulation rate to reduce the BLER for Layer 2 communication.

When MCS is used with a wireless device, there are tradeoffs when transmitting data from a transmitter to a receiver, i.e., an amount of data sent to a user may depend on a desired level of reliability and/or redundancy. 5G ULLC favors reliability and redundancy over a relatively large amount of data. If data is repeated on one side of a transmission, a majority rule is applied to the other side of the transmission to achieve more reliable data than data received at a relatively high rate.

To improve on these tradeoffs, redundancy is increased and data rate is decreased to achieve a lower latency. MCS is modified as disclosed herein. An amount of redundancy is modulated. When a cyclic redundancy check (CRC) is performed for storage, redundant bits are added to correct for errors. However, in some embodiments, data loss is not as important, particularly in the LA regions. In some embodiments, HA data is transmitted completely correctly, even at the expense of a reduction in data rate. Thus, the aforementioned "long tail" in distribution is mitigated or eliminated. In some embodiments, latency is improved by reducing the data rate of the HA data, for example, by reducing the MCS data rate by two or the like. 5.B. Use with WMM In one embodiment, the DSCP tags are mapped to WMM priorities, with the tag for HA data mapped to a higher priority level and with LA data mapped to a lower priority level. WMM in Wi-Fi routers implements a multi-level priority queue. Traffic of a higher priority queue is necessarily served before traffic in a lower priority queue (e.g., four levels specified). In some approaches, video traffic is assigned a single priority level (e.g., priority level 3); whereas, in some embodiments, a server uses a relatively high priority level, e.g., priority level 4, for HA traffic and a relatively low priority level, e.g., priority level 3, for LA traffic.

In some embodiments, lower latency and reliable transmission for HA image data mapped to a foveal region are achieved independently of whether WMM is implemented. Since the foveal region data is, in some embodiments, much smaller than the non-foveal region, the MCS stepdown is applied as a method for providing a lower latency path to the HA traffic even if both LA and HA traffic are tagged (e.g., with different code points) or if only HA traffic is tagged. In some embodiments, MCS adaptation for higher reliability is provided in conjunction with WMM mechanisms.

5.C. Removal of DSCP Tags by Intermediate Routers

DSCP code points are changed at an edge of a network by a router based on "flow detection." A flow is recognized using a 5-tuple parameter list (e.g., Source IP, Source Port, Destination IP, Destination Port, and Protocol). In some embodiments, where a network router replaces server-tagged DSCP code points with other code points based on a type of application or a flow fingerprint, both HA data and LA data are marked with a same code point with both identified as multimedia video traffic. For this embodiment, MCS adaptation based on destination port number for HA and LA data are provided. In some embodiments, an MCS parameter is modified to ensure a greater redundancy for the HA stream thereby ensuring a lower aggregate latency for the HA stream.

Figure 2:
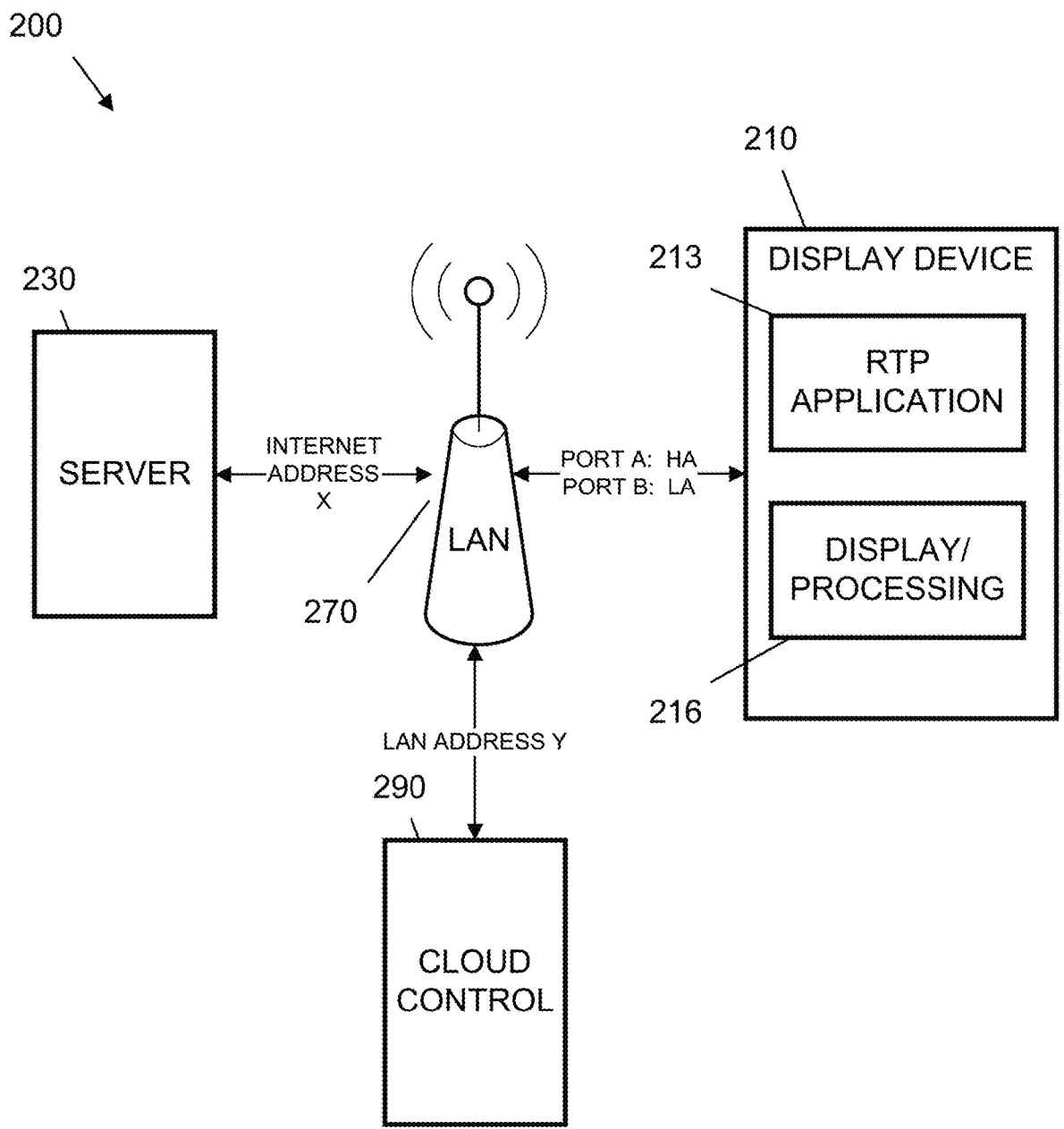
FIG. 2 depicts another system including an edge server and a cloud controller, in accordance with some embodiments of the disclosure.

FIG. 2 depicts an end-to-end communication system 200. The system includes a display device 210 (e.g., an HMD). In some embodiments, the display device 210 is configured with a client RTP application 213 communicating with a server 230 (e.g., an edge server) via Internet address X. The display device 210 is also configured with a display and/or processing module 216. The server 230 hosts a session and sends HA and LA data as requested by the RTP application 213 in the display device 210. The RTP application 213 is hosted on ports for the display device 210. For example, Port A is assigned for HA data, and Port B is assigned for LA data. The ports are identified and made available to a cloud controller 290 for a LAN router 270 (e.g., a WLAN) via LAN address Y. An MCS adaptation technique is programmed based on the destination port number. The MCS adaptation technique is implemented in Wi-Fi chipsets with the port configuration information controlled by the cloud controller 290.

In some embodiments, the router 270 receives traffic with a destination port for HA traffic and applies the MCS adaptation technique to improve the reliability of the HA traffic even though the incoming traffic is not necessarily marked with relevant DSCP tags. This allows for the case where intermediate routers may have modified or removed the DSCP tags. A mechanism of treating game traffic based on port information is provided. In some embodiments, MCS adaptation is applied to foveated rendering, i.e., MCS adaptation is applied to foveal data (and not to background data) by using destination port information.

Although FIG. 2 depicts the display device 210, the server 230, the communication device 270, and the cloud controller 290 as separate units, it is understood that one or more functions of the display device 210, the server 230, the communication device 270, and the cloud controller 290 may be combined or separated in any suitable combination. For instance, in one example, an HMD incorporates the display device 210 and the communication device 270. In another example, a cloud system incorporates the server 230 and the cloud controller 290.

6. Processing at HMDs

After the HA and LA regions are combined, traffic is marked for content at different resolutions, and an MCS adaptation technique is used to enhance the reliability of HA data. A system is provided including an edge server, a router, and an HMD. The edge server includes an additional ability to separate traffic into HA traffic and LA traffic and to tag the traffic. The router includes an ability to separate traffic with different DSCP codes into separate classes of traffic. Reliability is increased using MCS and resource block allocation for certain DSCP code traffic. The HMD is configured to combine HA and LA acuity traffic. In addition, depending on network conditions, an update rate for the LA regions is reduced and an update rate for the HA regions is increased, as needed.

Figure 3:
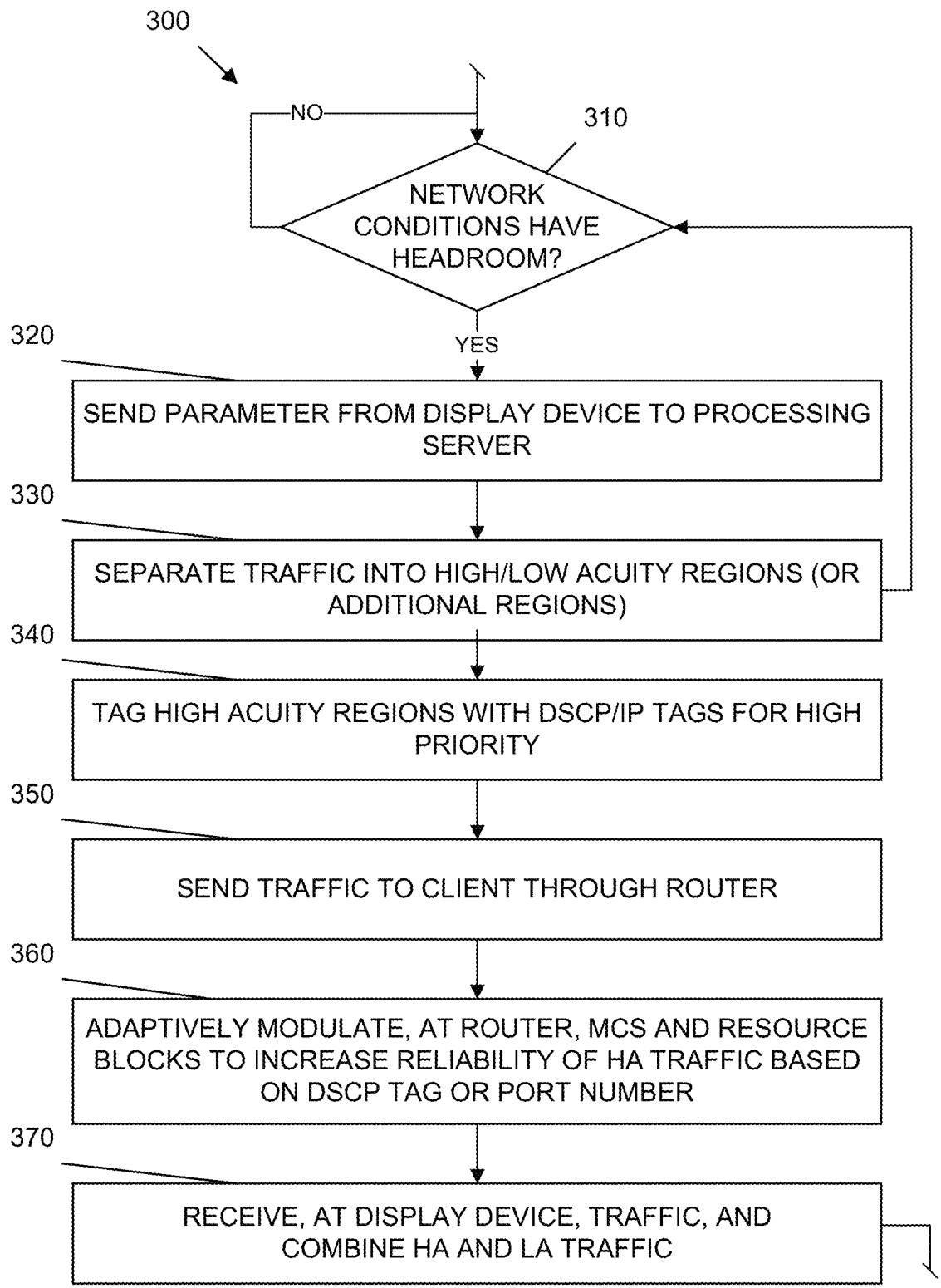
FIG. 3 depicts a process, in accordance with some embodiments of the disclosure.

A flow chart for a process 300 for operation of the HMD is shown in FIG. 3. The process 300 includes at least one of the steps 310 to 370. The process 300 includes determining 310 whether network conditions have headroom. If so (step 310=Yes), then the process 300 continues. If not (step 310=No), then the determining 310 repeats. The process 300 includes sending 320 a parameter (e.g., parameter 120) from a display device (e.g., display device 110 or 210) to a processing server (e.g., server 130 or 230). The process 300 includes separating 330 traffic into HA and/or LA regions (or additional regions). In some embodiments, after the separating 330, the determining 310 repeats. The determining 310 may repeat for a next frame, a next plurality of frames, or the like. The process 300 includes tagging 340 the HA regions with DSCP/IP tags for high priority. The process 300 includes sending 350 the traffic to a client through a router. The process 300 includes adaptively modulating 360, at the router, MCS and resource blocks in increase a reliability of HA traffic based on the DSCP tag or the port number. The process 300 includes receiving 370, at the display device, the traffic, and combining the HA and LA traffic.

Figure 4:
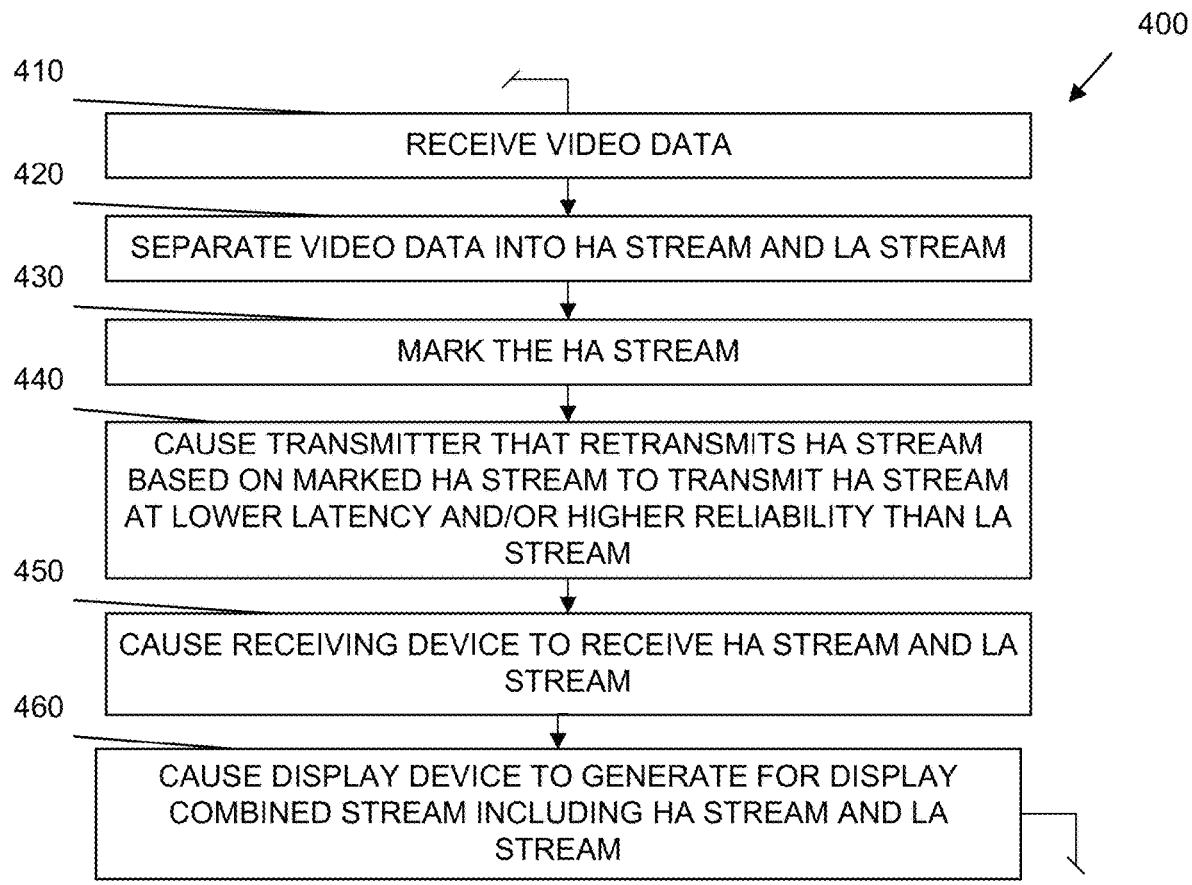
FIG. 4 depicts another process, in accordance with some embodiments of the disclosure.

As shown in FIG. 4, a process 400 includes at least one of the steps 410 to 460. The process 400 includes receiving 410 video data. The process 400 includes separating 420 the video data into a high acuity (HA) stream and a low acuity (LA) stream. The process 400 includes tagging 430 at least the HA stream. The process 400 includes causing 440 a communication device that retransmits the HA stream based on the tagged HA stream to transmit the HA stream at a lower latency and/or a higher reliability than the LA stream. The process 400 includes causing 450 a receiving device to receive the HA stream and the LA stream. The process 400 includes generating 460 for display a combined stream including the HA stream and the LA stream.

Figure 5:
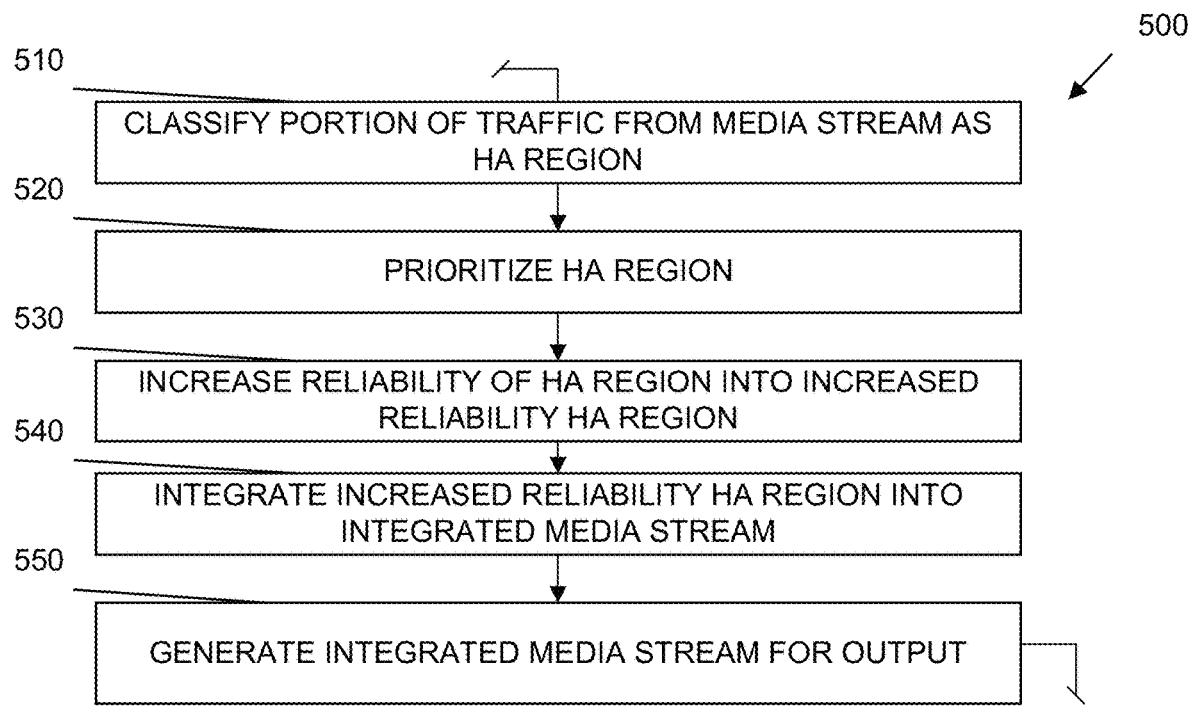
FIG. 5 depicts yet another process, in accordance with some embodiments of the disclosure.

As shown in FIG. 5, a process 500 includes at least one of the steps 510 to 550. The process 500 includes classifying 510 a portion of traffic from a media stream as a high acuity (HA) region. The process 500 includes prioritizing 520 the HA region. The process 500 includes increasing 530 a reliability of the HA region into an increased reliability HA region. The process 500 includes integrating 540 the increased reliability HA region into an integrated media stream. The process 500 includes generating 550 the integrated media stream for output.

Any of the steps of FIGS. 3-5 may be performed in real time, substantially in real time, and/or simultaneously with display on a suitably configured display device.

Non-limiting examples of embodiments of the disclosure are provided as follows.

Example 1: Separate traffic into classes based on identification of HA and LA regions. The identification may be based on user gaze or any other suitable parameter.

Example 2: Separate traffic into classes based on location where relevant movement and/or changes in user play occur.

Example 3: Use input devices (e.g., mouse, pointers, and the like) to separate traffic into classes for display devices.

Example 4: Use DSCP/IP precedence to mark classes of traffic for HA and LA regions.

Example 5: Prioritize sending HA traffic and processing on an edge server configured therefor.

Example 6: Increase reliability of the HA traffic on a router configured therefor.

Example 7: Use MCS modulation to increase reliability of the HA traffic on a router configured therefor.

Example 8: Use resource blocks to increase reliability of the HA traffic on a router configured therefor.

Example 9: Combine traffic streams at an HMD configured therefor.

Example 10: Communicate HA and LA parameters to a router by a communication device configured therefor.

Example 11: Dynamically increase redundancy of HA traffic based on network conditions.

Example 12: Apply WMM to high resolution foveal content.

Example 13: Apply WMM and MCS modulation modification based on port numbers.

Example 14: A system including at least one of Examples 1 to 13.

Predictive Model

Figure 6:
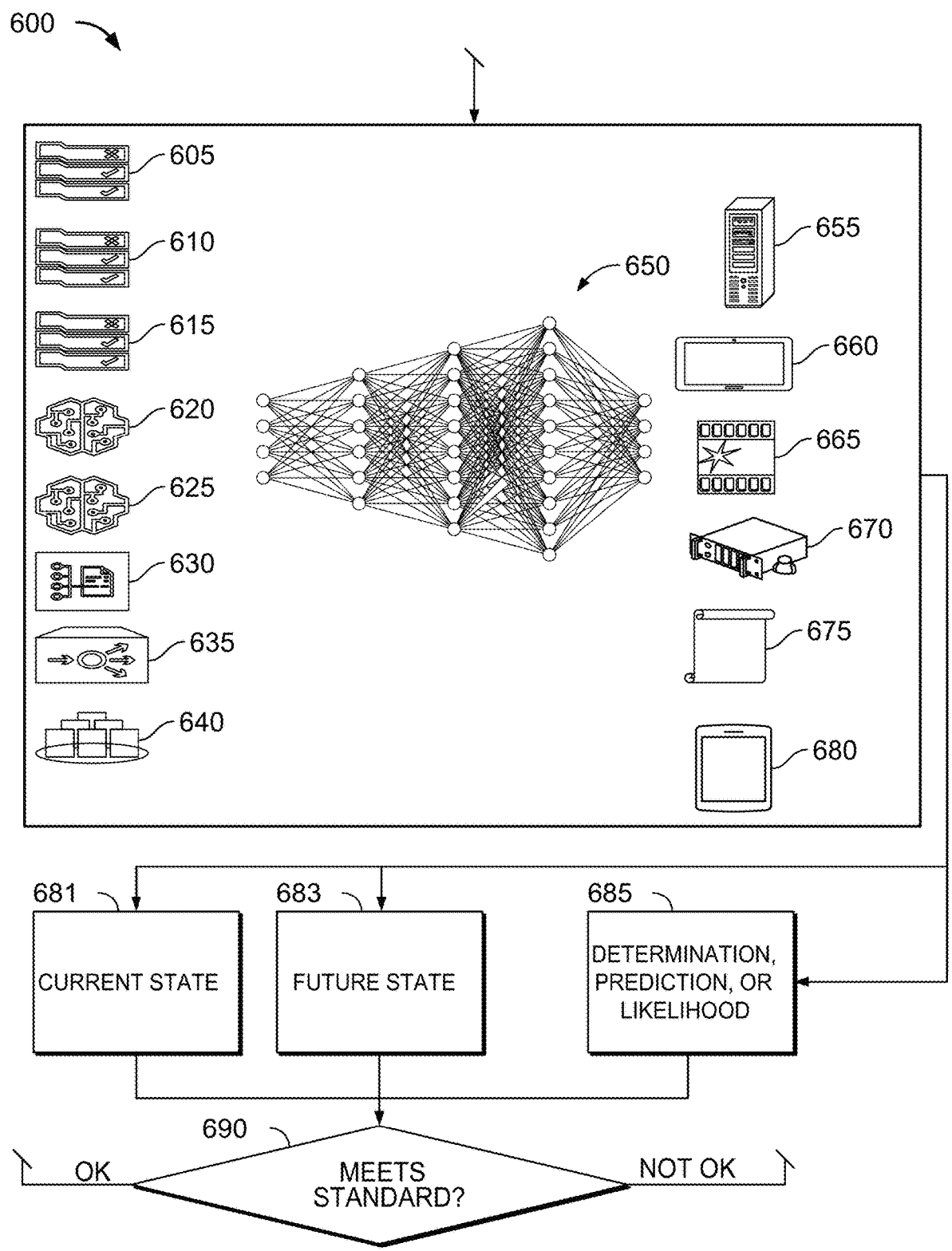
FIG. 6 depicts an artificial intelligence system, in accordance with some embodiments of the disclosure.

Throughout the present disclosure, determinations, predictions, likelihoods, and the like are determined with one or more predictive models. For example, FIG. 6 depicts a predictive model. A prediction process 600 includes a predictive model 650 in some embodiments. The predictive model 650 receives as input various forms of data about one, more or all the users, media content items, devices, and data described in the present disclosure. The predictive model 650 performs analysis based on at least one of hard rules, learning rules, hard models, learning models, usage data, load data, analytics of the same, metadata, or profile information, and the like. The predictive model 650 outputs one or more predictions of a future state of any of the devices described in the present disclosure. A load-increasing event is determined by load-balancing techniques, e.g., least connection, least bandwidth, round robin, server response time, weighted versions of the same, resource-based techniques, and address hashing. The predictive model 650 is based on input including at least one of a hard rule 605, a user-defined rule 610, a rule defined by a content provider 615, a hard model 620, or a learning model 625.

The predictive model 650 receives as input usage data 630. The predictive model 650 is based, in some embodiments, on at least one of a usage pattern of the user or media device, a usage pattern of the requesting media device, a usage pattern of the media content item, a usage pattern of the communication system or network, a usage pattern of the profile, or a usage pattern of the media device.

The predictive model 650 receives as input load-balancing data 635. The predictive model 650 is based on at least one of load data of the display device, load data of the requesting media device, load data of the media content item, load data of the communication system or network, load data of the profile, or load data of the media device.

The predictive model 650 receives as input metadata 640. The predictive model 650 is based on at least one of metadata of the streaming service, metadata of the requesting media device, metadata of the media content item, metadata of the communication system or network, metadata of the profile, or metadata of the media device. The metadata includes information of the type represented in the media device manifest.

The predictive model 650 is trained with data. The training data is developed in some embodiments using one or more data techniques including but not limited to data selection, data sourcing, and data synthesis. The predictive model 650 is trained in some embodiments with one or more analytical techniques including but not limited to classification and regression trees (CART), discrete choice models, linear regression models, logistic regression, log it versus probit, multinomial logistic regression, multivariate adaptive regression splines, probit regression, regression techniques, survival or duration analysis, and time series models. The predictive model 650 is trained in some embodiments with one or more machine learning approaches including but not limited to supervised learning, unsupervised learning, semi-supervised learning, reinforcement learning, and dimensionality reduction. The predictive model 650 in some embodiments includes regression analysis including analysis of variance (ANOVA), linear regression, logistic regression, ridge regression, and/or time series. The predictive model 650 in some embodiments includes classification analysis including decision trees and/or neural networks. In FIG. 6, a depiction of a multi-layer neural network is provided as a non-limiting example of a predictive model 650, the neural network including an input layer (left side), three hidden layers (middle), and an output layer (right side) with 32 neurons and 192 edges, which is intended to be illustrative, not limiting. The predictive model 650 is based on data engineering and/or modeling techniques. The data engineering techniques include exploration, cleaning, normalizing, feature engineering, and scaling. The modeling techniques include model selection, training, evaluation, and tuning. The predictive model 650 is operationalized using registration, deployment, monitoring, and/or retraining techniques.

The predictive model 640 is configured to output results to a device or multiple devices. The device includes means for performing one, more, or all the features referenced herein of the methods, processes, and outputs of one or more of FIGS. 3-5, inclusive, in any suitable combination. The device is at least one of a server 655, a tablet 660, a media display device 665, a network-connected computer 670, a media device 675, a computing device 680, or the like.

The predictive model 650 is configured to output a current state 681, and/or a future state 683, and/or a determination, a prediction, or a likelihood 685, and the like. The current state 681, and/or the future state 683, and/or the determination, the prediction, or the likelihood 685, and the like may be compared 690 to a predetermined or determined standard. In some embodiments, the standard is satisfied (690=OK) or rejected (690=NOT OK). If the standard is satisfied or rejected, the predictive process 600 outputs at least one of the current state, the future state, the determination, the prediction, or the likelihood to any device or module disclosed herein.

Communication System

Figure 7:
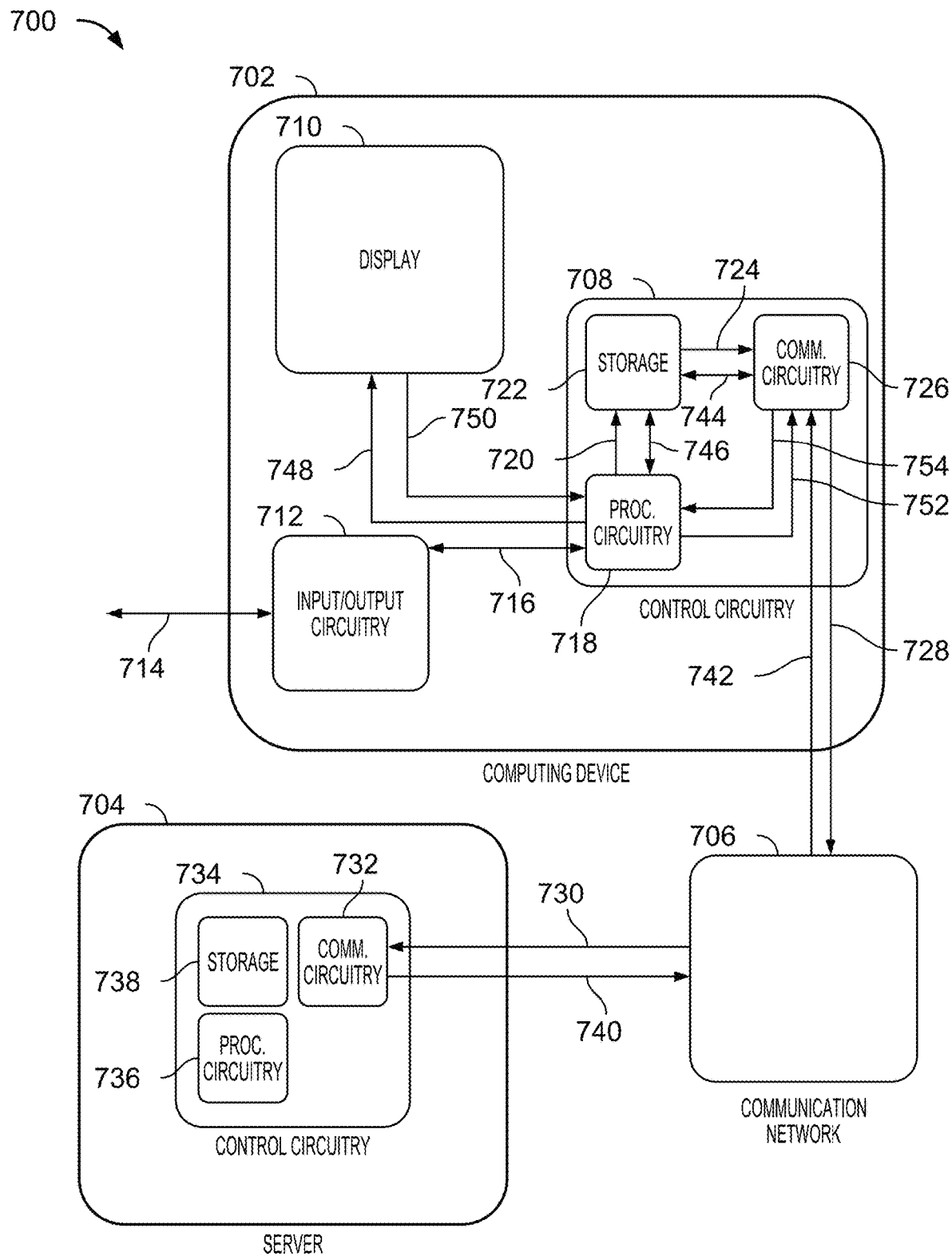
FIG. 7 depicts a system including a server, a communication network, and a computing device for performing the methods and processes noted herein, in accordance with some embodiments of the disclosure.

FIG. 7 depicts a block diagram of system 700, in accordance with some embodiments. The system is shown to include computing device 702, server 704, and a communication network 706. It is understood that while a single instance of a component may be shown and described relative to FIG. 7, additional embodiments of the component may be employed. For example, server 704 may include, or may be incorporated in, more than one server. Similarly, communication network 706 may include, or may be incorporated in, more than one communication network. Server 704 is shown communicatively coupled to computing device 702 through communication network 706. While not shown in FIG. 7, server 704 may be directly communicatively coupled to computing device 702, for example, in a system absent or bypassing communication network 706.

Communication network 706 may include one or more network systems, such as, without limitation, the Internet, LAN, Wi-Fi, wireless, or other network systems suitable for audio processing applications. The system 700 of FIG. 7 excludes server 704, and functionality that would otherwise be implemented by server 704 is instead implemented by other components of the system depicted by FIG. 7, such as one or more components of communication network 706. In still other embodiments, server 704 works in conjunction with one or more components of communication network 706 to implement certain functionality described herein in a distributed or cooperative manner. Similarly, the system depicted by FIG. 7 excludes computing device 702, and functionality that would otherwise be implemented by computing device 702 is instead implemented by other components of the system depicted by FIG. 7, such as one or more components of communication network 706 or server 704 or a combination of the same. In other embodiments, computing device 702 works in conjunction with one or more components of communication network 706 or server 704 to implement certain functionality described herein in a distributed or cooperative manner.

Computing device 702 includes control circuitry 708, display 710 and input/output (I/O) circuitry 712. Control circuitry 708 may be based on any suitable processing circuitry and includes control circuits and memory circuits, which may be disposed on a single integrated circuit or may be discrete components. As referred to herein, processing circuitry should be understood to mean circuitry based on at least one microprocessors, microcontrollers, digital signal processors, programmable logic devices, field-programmable gate arrays (FPGAs), or application-specific integrated circuits (ASICs), and the like, and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 708 in turn includes communication circuitry 726, storage 722 and processing circuitry 718. Either of control circuitry 708 and 734 may be utilized to execute or perform any or all the methods, processes, and outputs of one or more of FIGS. 3-5, or any combination of steps thereof (e.g., as enabled by processing circuitries 718 and 736, respectively).

In addition to control circuitry 708 and 734, computing device 702 and server 704 may each include storage (storage 722, and storage 738, respectively). Each of storages 722 and 738 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 8D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 722 and 738 may be used to store several types of content, metadata, and/or other types of data. Non-volatile memory may also be used (e.g., to launch a boot-up routine and other instructions). Cloud-based storage may be used to supplement storages 722 and 738 or instead of storages 722 and 738. In some embodiments, a user profile and messages corresponding to a chain of communication may be stored in one or more of storages 722 and 738. Each of storages 722 and 738 may be utilized to store commands, for example, such that when each of processing circuitries 718 and 736, respectively, are prompted through control circuitries 708 and 734, respectively. Either of processing circuitries 718 or 736 may execute any of the methods, processes, and outputs of one or more of FIGS. 3-5, or any combination of steps thereof.

In some embodiments, control circuitry 708 and/or 734 executes instructions for an application stored in memory (e.g., storage 722 and/or storage 738). Specifically, control circuitry 708 and/or 734 may be instructed by the application to perform the functions discussed herein. In some embodiments, any action performed by control circuitry 708 and/or 734 may be based on instructions received from the application. For example, the application may be implemented as software or a set of and/or one or more executable instructions that may be stored in storage 722 and/or 738 and executed by control circuitry 708 and/or 734. The application may be a client/server application where only a client application resides on computing device 702, and a server application resides on server 704.

The application may be implemented using any suitable architecture. For example, it may be a stand-alone application wholly implemented on computing device 702. In such an approach, instructions for the application are stored locally (e.g., in storage 722), and data for use by the application is downloaded on a periodic basis (e.g., from an out-of-band feed, from an Internet resource, or using another suitable approach). Control circuitry 708 may retrieve instructions for the application from storage 722 and process the instructions to perform the functionality described herein. Based on the processed instructions, control circuitry 708 may determine a type of action to perform in response to input received from I/O circuitry 712 or from communication network 706.

In client/server-based embodiments, control circuitry 708 may include communication circuitry suitable for communicating with an application server (e.g., server 704) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 706). In another example of a client/server-based application, control circuitry 708 runs a web browser that interprets web pages provided by a remote server (e.g., server 704). For example, the remote server may store the instructions for the application in a storage device.

The remote server may process the stored instructions using circuitry (e.g., control circuitry 734) and/or generate displays. Computing device 702 may receive the displays generated by the remote server and may display the content of the displays locally via display 710. For example, display 710 may be utilized to present a string of characters. This way, the processing of the instructions is performed remotely (e.g., by server 704) while the resulting displays, such as the display windows described elsewhere herein, are provided locally on computing device 704. Computing device 702 may receive inputs from the user via input/output circuitry 712 and transmit those inputs to the remote server for processing and generating the corresponding displays.

Alternatively, computing device 702 may receive inputs from the user via input/output circuitry 712 and process and display the received inputs locally, by control circuitry 708 and display 710, respectively. For example, input/output circuitry 712 may correspond to a keyboard and/or a set of and/or one or more speakers/microphones which are used to receive user inputs (e.g., input as displayed in a search bar or a display of FIG. 7 on a computing device). Input/output circuitry 712 may also correspond to a communication link between display 710 and control circuitry 708 such that display 710 updates in response to inputs received via input/output circuitry 712 (e.g., simultaneously update what is shown in display 710 based on inputs received by generating corresponding outputs based on instructions stored in memory via a non-transitory, computer-readable medium).

Server 704 and computing device 702 may transmit and receive content and data such as media content via communication network 706. For example, server 704 may be a media content provider, and computing device 702 may be a smart television configured to download or stream media content, such as a live news broadcast, from server 704. Control circuitry 734, 708 may send and receive commands, requests, and other suitable data through communication network 706 using communication circuitry 732, 726, respectively. Alternatively, control circuitry 734, 708 may communicate directly with each other using communication circuitry 732, 726, respectively, avoiding communication network 706.

It is understood that computing device 702 is not limited to the embodiments and methods shown and described herein. In nonlimiting examples, computing device 702 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same, capable of suitably displaying and manipulating media content.

Computing device 702 receives user input 714 at input/output circuitry 712. For example, computing device 702 may receive a user input such as a user swipe or user touch. It is understood that computing device 702 is not limited to the embodiments and methods shown and described herein.

User input 714 may be received from a user selection-capturing interface that is separate from device 702, such as a remote-control device, trackpad, or any other suitable user movement-sensitive, audio-sensitive or capture devices, or as part of device 702, such as a touchscreen of display 710. Transmission of user input 714 to computing device 702 may be accomplished using a wired connection, such as an audio cable, USB cable, ethernet cable and the like attached to a corresponding input port at a local device, or may be accomplished using a wireless connection, such as Bluetooth, Wi-Fi, WiMAX, GSM, UTMS, CDMA, TDMA, 8G, 4G, 4G LTE, 5G, or any other suitable wireless transmission protocol. Input/output circuitry 712 may include a physical input port such as a 12.5 mm (0.4921 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 3G, 4G, 4G LTE, 5G, or other wireless transmission protocols.

Processing circuitry 718 may receive user input 714 from input/output circuitry 712 using communication path 716. Processing circuitry 718 may convert or translate the received user input 714 that may be in the form of audio data, visual data, gestures, or movement to digital signals. In some embodiments, input/output circuitry 712 performs the translation to digital signals. In some embodiments, processing circuitry 718 (or processing circuitry 736, as the case may be) carries out disclosed processes and methods.

Processing circuitry 718 may provide requests to storage 722 by communication path 720. Storage 722 may provide requested information to processing circuitry 718 by communication path 746. Storage 722 may transfer a request for information to communication circuitry 726 which may translate or encode the request for information to a format receivable by communication network 706 before transferring the request for information by communication path 728. Communication network 706 may forward the translated or encoded request for information to communication circuitry 732, by communication path 730.

At communication circuitry 732, the translated or encoded request for information, received through communication path 730, is translated or decoded for processing circuitry 736, which will provide a response to the request for information based on information available through control circuitry 734 or storage 738, or a combination thereof. The response to the request for information is then provided back to communication network 706 by communication path 740 in an encoded or translated format such that communication network 706 forwards the encoded or translated response back to communication circuitry 726 by communication path 742.

At communication circuitry 726, the encoded or translated response to the request for information may be provided directly back to processing circuitry 718 by communication path 754 or may be provided to storage 722 through communication path 744, which then provides the information to processing circuitry 718 by communication path 746. Processing circuitry 718 may also provide a request for information directly to communication circuitry 726 through communication path 752, where storage 722 responds to an information request (provided through communication path 720 or 744) by communication path 724 or 746 that storage 722 does not contain information pertaining to the request from processing circuitry 718.

Processing circuitry 718 may process the response to the request received through communication paths 746 or 754 and may provide instructions to display 710 for a notification to be provided to the users through communication path 748. Display 710 may incorporate a timer for providing the notification or may rely on inputs through input/output circuitry 712 from the user, which are forwarded through processing circuitry 718 through communication path 748, to determine how long or in what format to provide the notification. When display 710 determines the display has been completed, a notification may be provided to processing circuitry 718 through communication path 750.

The communication paths provided in FIG. 7 between computing device 702, server 704, communication network 706, and all subcomponents depicted are examples and may be modified to reduce processing time or enhance processing capabilities for each step in the processes disclosed herein by one skilled in the art.

Terminology

The terminology used herein is for the purpose of describing particular embodiments only and is not intended to be limiting of the disclosure.

Throughout the present disclosure, the term "XR" includes without limitation extended reality (XR), augmented reality (AR), 3D content, 4D experiences, next-gen UIs, virtual reality (VR), mixed reality (MR) experiences, interactive experiences, a combination of the same, and the like.

As used herein, the terms "real time," "substantially in real time," "simultaneous," and the like are understood to be nearly instantaneous but may include delay due to practical limits of the system. Such delays may be on the order of milliseconds or microseconds, depending on the application and nature of the processing. Relatively longer delays (e.g., greater than a millisecond) may result due to communication or processing delays, particularly in remote and cloud computing environments.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least one embodiment is described as using a plurality of units or modules to perform a process or processes, it is understood that the process or processes may also be performed by one or a plurality of units or modules. Additionally, it is understood that the term controller/control unit may refer to a hardware device that includes a memory and a processor. The memory may be configured to store the units or the modules and the processor may be specifically configured to execute said units or modules to perform one or more processes which are described herein.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third", and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), and the like.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

The systems and processes discussed herein are intended to be illustrative and not limiting. One skilled in the art would appreciate that the actions of the processes discussed herein may be omitted, modified, combined, and/or rearranged, and any additional actions may be performed without departing from the scope of the invention. More generally, the disclosure herein is meant to provide examples and is not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the methods and systems described herein may be performed in real time. It should also be noted that the methods and/or systems described herein may be applied to, or used in accordance with, other methods and/or systems.

This specification discloses embodiments, which include, but are not limited to, the following items:

Item 1. A method comprising:
  receiving video data;
  separating the video data into a high acuity (HA) stream and a low acuity (LA) stream;
  marking the HA stream to indicate HA transmission;
  causing a communication device that retransmits the HA stream, based on the marking, to transmit the HA stream at a lower latency and/or a higher reliability than the LA stream;
  causing a receiving device to receive the HA stream and the LA stream; and
  causing a display device to generate for display a combined stream including the HA stream and the LA stream.

Item 2. The method of item 1, wherein the causing the communication device that retransmits the HA stream, based on the marking, to transmit the HA stream at the lower latency and/or at the higher reliability than the LA stream comprises:
  causing the communication device that retransmits the HA stream based on the marked HA stream to transmit the HA stream with greater redundancy per total data sent than for the LA stream.

Item 3. The method of item 2, wherein the greater redundancy includes decreasing a coding rate for the HA stream relative to the LA stream, and wherein the coding rate is a proportion of a first portion of the HA stream that is non-redundant to a second portion of the HA stream that is redundant.

Item 4. The method of item 1, wherein the causing the communication device that retransmits the HA stream, based on the marking, to transmit the HA stream at the lower latency and/or at the higher reliability than the LA stream comprises:

causing the communication device that retransmits the HA stream based on the marked HA stream to transmit the HA stream at a retransmission rate lower than for the LA stream.

Item 5. The method of item 1, wherein the causing the communication device that retransmits the HA stream, based on the marking, to transmit the HA stream at the lower latency and/or at the higher reliability than the LA stream comprises:
causing the communication device that retransmits the HA stream based on the marked HA stream to transmit the HA stream with greater redundancy per total data sent than for the LA stream; and
causing the communication device that retransmits the HA stream based on the marked HA stream to transmit the HA stream at a retransmission rate lower than for the LA stream.

Item 6. The method of item 1, wherein the marking the HA stream to indicate the HA transmission comprises:
tagging or modifying at least one header of at least one packet of the HA stream.

Item 7. The method of item 1, wherein the marking the HA stream to indicate the HA transmission comprises:
addressing the HA stream to a specific port or a specific address associated with the HA transmission.

Item 8. The method of item 1, wherein the marking the HA stream to indicate the HA transmission comprises:
marking the HA stream by tagging a header of the HA stream with a Differentiated Services Code Point (DSCP) precedence field or an IP precedence field.

Item 9. The method of item 1, comprising:
separately encoding the HA stream and the LA stream.

Item 10. The method of item 1, wherein the separating the video data into the HA stream and the LA stream comprises:
separating the video data into the HA stream and the LA stream based on a user location in an extended reality space associated with the video data.

Item 11. The method of item 1, wherein the separating the video data into the HA stream and the LA stream comprises:
separating the video data into the HA stream and the LA stream based on a user movement in an extended reality space associated with the video data.

Item 12. The method of item 1, wherein the separating the video data into the HA stream and the LA stream comprises:
separating the video data into the HA stream and the LA stream based on a change in play in an extended reality space associated with the video data.

Item 13. The method of item 1, wherein the separating the video data into the HA stream and the LA stream comprises:
separating the video data into the HA stream and the LA stream based on a signal from a user-operated input device.

Item 14. The method of item 1, wherein the causing the communication device that retransmits the HA stream, based on the marking, to transmit the HA stream at the lower latency and/or at the higher reliability than the LA stream comprises:
modulating the HA stream with a modulation coding scheme based on a port number.

Item 15. The method of item 1, wherein the causing the communication device that retransmits the HA stream, based on the marking, to transmit the HA stream at the lower latency and/or at the higher reliability than the LA stream comprises:
compensating for additional transmission time by adding a resource block.

Item 16. The method of item 1, wherein the causing the communication device that retransmits the HA stream, based on the marking, to transmit the HA stream at the lower latency and/or at the higher reliability than the LA stream comprises:
reducing a block error rate of the LA stream.

Item 17. The method of item 1, wherein the causing the communication device that retransmits the HA stream, based on the marking, to transmit the HA stream at the lower latency and/or at the higher reliability than the LA stream comprises:
modifying a transmit parameter.

Item 18. The method of item 1, comprising:
applying Wi-Fi Multimedia (WMM) to the combined stream.

Item 19. The method of item 18, comprising:
modifying the WMM based on a port number.

Item 20. The method of item 1,
wherein the causing the communication device that retransmits the HA stream, based on the marking, to transmit the HA stream at the lower latency and/or at the higher reliability than the LA stream comprises:
causing the communication device that retransmits the HA stream based on the marked HA stream to transmit the HA stream with greater redundancy per total data sent than for the LA stream, wherein the greater redundancy includes decreasing a coding rate for the HA stream relative to the LA stream, and wherein the coding rate is a proportion of a first portion of the HA stream that is non-redundant to a second portion of the HA stream that is redundant;
causing the communication device that retransmits the HA stream based on the marked HA stream to transmit the HA stream at a retransmission rate lower than for the LA stream;
modulating the HA stream with a modulation coding scheme based on a port number or an address associated with the HA transmission;
compensating for additional transmission time by adding a resource block; and
reducing a block error rate of the LA stream;
wherein the marking the HA stream to indicate the HA transmission comprises:
tagging or modifying at least one header of at least one packet of the HA stream with a Differentiated Services Code Point (DSCP) precedence field or an IP precedence field; and
addressing the HA stream to the port number or the address associated with the HA transmission.

Item 21. A system comprising:
circuitry configured to:
receive video data;
separate the video data into a high acuity (HA) stream and a low acuity (LA) stream;
mark the HA stream to indicate HA transmission;
cause a communication device that retransmits the HA stream, based on the marking, to transmit the HA stream at a lower latency and/or a higher reliability than the LA stream;
cause a receiving device to receive the HA stream and the LA stream; and
cause a display device to generate for display a combined stream including the HA stream and the LA stream.

Item 22. The system of item 21, wherein the circuitry configured to cause the communication device that retransmits the HA stream, based on the marking, to transmit the HA stream at the lower latency and/or at the higher reliability than the LA stream is configured to:
  cause the communication device that retransmits the HA stream based on the marked HA stream to transmit the HA stream with greater redundancy per total data sent than for the LA stream.

Item 23. The system of item 22, wherein the greater redundancy includes decreasing a coding rate for the HA stream relative to the LA stream, and wherein the coding rate is a proportion of a first portion of the HA stream that is non-redundant to a second portion of the HA stream that is redundant.

Item 24. The system of item 21, wherein the circuitry configured to cause the communication device that retransmits the HA stream, based on the marking, to transmit the HA stream at the lower latency and/or at the higher reliability than the LA stream is configured to:
  cause the communication device that retransmits the HA stream based on the marked HA stream to transmit the HA stream at a retransmission rate lower than for the LA stream.

Item 25. The system of item 21, wherein the circuitry configured to cause the communication device that retransmits the HA stream, based on the marking, to transmit the HA stream at the lower latency and/or at the higher reliability than the LA stream is configured to:
  cause the communication device that retransmits the HA stream based on the marked HA stream to transmit the HA stream with greater redundancy per total data sent than for the LA stream; and
  cause the communication device that retransmits the HA stream based on the marked HA stream to transmit the HA stream at a retransmission rate lower than for the LA stream.

Item 26. The system of item 21, wherein the circuitry configured to mark the HA stream to indicate the HA transmission is configured to:
  tag or modify at least one header of at least one packet of the HA stream.

Item 27. The system of item 21, wherein the circuitry configured to mark the HA stream to indicate the HA transmission is configured to:
  address the HA stream to a specific port or a specific address associated with the HA transmission.

Item 28. The system of item 21, wherein the circuitry configured to mark the HA stream to indicate the HA transmission is configured to:
  mark the HA stream by tagging a header of the HA stream with a Differentiated Services Code Point (DSCP) precedence field or an IP precedence field.

Item 29. The system of item 21, wherein the circuitry is configured to:
  separately encode the HA stream and the LA stream.

Item 30. The system of item 21, wherein the circuitry configured to separate the video data into the HA stream and the LA stream is configured to:
  separate the video data into the HA stream and the LA stream based on a user location in an extended reality space associated with the video data.

Item 31. The system of item 21, wherein the circuitry configured to separate the video data into the HA stream and the LA stream is configured to:
  separate the video data into the HA stream and the LA stream based on a user movement in an extended reality space associated with the video data.

Item 32. The system of item 21, wherein the circuitry configured to separate the video data into the HA stream and the LA stream is configured to:
  separate the video data into the HA stream and the LA stream based on a change in play in an extended reality space associated with the video data.

Item 33. The system of item 21, wherein the circuitry configured to separate the video data into the HA stream and the LA stream is configured to:
  separate the video data into the HA stream and the LA stream based on a signal from a user-operated input device.

Item 34. The system of item 21, wherein the circuitry configured to cause the communication device that retransmits the HA stream, based on the marking, to transmit the HA stream at the lower latency and/or at the higher reliability than the LA stream is configured to:
  modulate the HA stream with a modulation coding scheme based on a port number.

Item 35. The system of item 21, wherein the circuitry configured to cause the communication device that retransmits the HA stream, based on the marking, to transmit the HA stream at the lower latency and/or at the higher reliability than the LA stream is configured to:
  compensate for additional transmission time by adding a resource block.

Item 36. The system of item 21, wherein the circuitry configured to cause the communication device that retransmits the HA stream, based on the marking, to transmit the HA stream at the lower latency and/or at the higher reliability than the LA stream is configured to:
  reduce a block error rate of the LA stream.

Item 37. The system of item 21, wherein the circuitry configured to cause the communication device that retransmits the HA stream, based on the marking, to transmit the HA stream at the lower latency and/or at the higher reliability than the LA stream is configured to:
  modify a transmit parameter.

Item 38. The system of item 21, wherein the circuitry is configured to:
  apply Wi-Fi Multimedia (WMM) to the combined stream.

Item 39. The system of item 38, wherein the circuitry is configured to:
  modify the WMM based on a port number.

Item 40. The system of item 21,
  wherein the circuitry configured to cause the communication device that retransmits the HA stream, based on the marking, to transmit the HA stream at the lower latency and/or at the higher reliability than the LA stream is configured to:
  cause the communication device that retransmits the HA stream based on the marked HA stream to transmit the HA stream with greater redundancy per total data sent than for the LA stream, wherein the greater redundancy includes decreasing a coding rate for the HA stream relative to the LA stream, and wherein the coding rate is a proportion of a first portion of the HA stream that is non-redundant to a second portion of the HA stream that is redundant;
  cause the communication device that retransmits the HA stream based on the marked HA stream to transmit the HA stream at a retransmission rate lower than for the LA stream;
  modulate the HA stream with a modulation coding scheme based on a port number or an address associated with the HA transmission;

compensate for additional transmission time by adding a resource block; and
reduce a block error rate of the LA stream;
wherein the circuitry configured to mark the HA stream to indicate the HA transmission is configured to:
tag or modify at least one header of at least one packet of the HA stream with a Differentiated Services Code Point (DSCP) precedence field or an IP precedence field; and
address the HA stream to the port number or the address associated with the HA transmission.

Item 41. A device comprising:
means for receiving video data;
means for separating the video data into a high acuity (HA) stream and a low acuity (LA) stream;
means for marking the HA stream to indicate HA transmission;
means for causing a communication device that retransmits the HA stream, based on the marking, to transmit the HA stream at a lower latency and/or a higher reliability than the LA stream;
means for causing a receiving device to receive the HA stream and the LA stream; and
means for causing a display device to generate for display a combined stream including the HA stream and the LA stream.

Item 42. The device of item 41, wherein the means for causing the communication device that retransmits the HA stream, based on the marking, to transmit the HA stream at the lower latency and/or at the higher reliability than the LA stream comprises:
means for causing the communication device that retransmits the HA stream based on the marked HA stream to transmit the HA stream with greater redundancy per total data sent than for the LA stream.

Item 43. The device of item 42, wherein the greater redundancy includes decreasing a coding rate for the HA stream relative to the LA stream, and wherein the coding rate is a proportion of a first portion of the HA stream that is non-redundant to a second portion of the HA stream that is redundant.

Item 44. The device of item 41, wherein the means for causing the communication device that retransmits the HA stream, based on the marking, to transmit the HA stream at the lower latency and/or at the higher reliability than the LA stream comprises:
means for causing the communication device that retransmits the HA stream based on the marked HA stream to transmit the HA stream at a retransmission rate lower than for the LA stream.

Item 45. The device of item 41, wherein the means for causing the communication device that retransmits the HA stream, based on the marking, to transmit the HA stream at the lower latency and/or at the higher reliability than the LA stream comprises:
means for causing the communication device that retransmits the HA stream based on the marked HA stream to transmit the HA stream with greater redundancy per total data sent than for the LA stream; and
means for causing the communication device that retransmits the HA stream based on the marked HA stream to transmit the HA stream at a retransmission rate lower than for the LA stream.

Item 46. The device of item 41, wherein the means for marking the HA stream to indicate the HA transmission comprises:
means for tagging or modifying at least one header of at least one packet of the HA stream.

Item 47. The device of item 41, wherein the means for marking the HA stream to indicate the HA transmission comprises:
means for addressing the HA stream to a specific port or a specific address associated with the HA transmission.

Item 48. The device of item 41, wherein the means for marking the HA stream to indicate the HA transmission comprises:
means for marking the HA stream by tagging a header of the HA stream with a Differentiated Services Code Point (DSCP) precedence field or an IP precedence field.

Item 49. The device of item 41, comprising:
means for separately encoding the HA stream and the LA stream.

Item 50. The device of item 41, wherein the means for separating the video data into the HA stream and the LA stream comprises:
means for separating the video data into the HA stream and the LA stream based on a user location in an extended reality space associated with the video data.

Item 51. The device of item 41, wherein the means for separating the video data into the HA stream and the LA stream comprises:
means for separating the video data into the HA stream and the LA stream based on a user movement in an extended reality space associated with the video data.

Item 52. The device of item 41, wherein the means for separating the video data into the HA stream and the LA stream comprises:
means for separating the video data into the HA stream and the LA stream based on a change in play in an extended reality space associated with the video data.

Item 53. The device of item 41, wherein the means for separating the video data into the HA stream and the LA stream comprises:
means for separating the video data into the HA stream and the LA stream based on a signal from a user-operated input device.

Item 54. The device of item 41, wherein the means for causing the communication device that retransmits the HA stream, based on the marking, to transmit the HA stream at the lower latency and/or at the higher reliability than the LA stream comprises:
means for modulating the HA stream with a modulation coding scheme based on a port number.

Item 55. The device of item 41, wherein the means for causing the communication device that retransmits the HA stream, based on the marking, to transmit the HA stream at the lower latency and/or at the higher reliability than the LA stream comprises:
means for compensating for additional transmission time by adding a resource block.

Item 56. The device of item 41, wherein the means for causing the communication device that retransmits the HA stream, based on the marking, to transmit the HA stream at the lower latency and/or at the higher reliability than the LA stream comprises:
means for reducing a block error rate of the LA stream.

Item 57. The device of item 41, wherein the means for causing the communication device that retransmits the HA stream, based on the marking, to transmit the HA stream at the lower latency and/or at the higher reliability than the LA stream comprises:
means for modifying a transmit parameter.

Item 58. The device of item 41, comprising:
means for applying Wi-Fi Multimedia (WMM) to the combined stream.

Item 59. The device of item 58, comprising:
means for modifying the WMM based on a port number.

Item 60. The device of item 41,
wherein the means for causing the communication device that retransmits the HA stream, based on the marking, to transmit the HA stream at the lower latency and/or at the higher reliability than the LA stream comprises:
means for causing the communication device that retransmits the HA stream based on the marked HA stream to transmit the HA stream with greater redundancy per total data sent than for the LA stream, wherein the greater redundancy includes decreasing a coding rate for the HA stream relative to the LA stream, and wherein the coding rate is a proportion of a first portion of the HA stream that is non-redundant to a second portion of the HA stream that is redundant;
means for causing the communication device that retransmits the HA stream based on the marked HA stream to transmit the HA stream at a retransmission rate lower than for the LA stream;
means for modulating the HA stream with a modulation coding scheme based on a port number or an address associated with the HA transmission;
means for compensating for additional transmission time by adding a resource block; and
means for reducing a block error rate of the LA stream;
wherein the means for marking the HA stream to indicate the HA transmission comprises:
means for tagging or modifying at least one header of at least one packet of the HA stream with a Differentiated Services Code Point (DSCP) precedence field or an IP precedence field; and
means for addressing the HA stream to the port number or the address associated with the HA transmission.

Item 61. A non-transitory, computer-readable medium having non-transitory, computer-readable instructions encoded thereon that when executed are configured to:
receive video data;
separate the video data into a high acuity (HA) stream and a low acuity (LA) stream;
mark the HA stream to indicate HA transmission;
cause a communication device that retransmits the HA stream, based on the marking, to transmit the HA stream at a lower latency and/or a higher reliability than the LA stream;
cause a receiving device to receive the HA stream and the LA stream; and
cause a display device to generate for display a combined stream including the HA stream and the LA stream.

Item 62. The non-transitory, computer-readable medium of item 61, wherein the instructions configured to cause the communication device that retransmits the HA stream, based on the marking, to transmit the HA stream at the lower latency and/or at the higher reliability than the LA stream are configured to:
cause the communication device that retransmits the HA stream based on the marked HA stream to transmit the HA stream with greater redundancy per total data sent than for the LA stream.

Item 63. The non-transitory, computer-readable medium of item 62, wherein the greater redundancy includes decreasing a coding rate for the HA stream relative to the LA stream, and wherein the coding rate is a proportion of a first portion of the HA stream that is non-redundant to a second portion of the HA stream that is redundant.

Item 64. The non-transitory, computer-readable medium of item 61, wherein the instructions configured to cause the communication device that retransmits the HA stream, based on the marking, to transmit the HA stream at the lower latency and/or at the higher reliability than the LA stream are configured to:
cause the communication device that retransmits the HA stream based on the marked HA stream to transmit the HA stream at a retransmission rate lower than for the LA stream.

Item 65. The non-transitory, computer-readable medium of item 61, wherein the instructions configured to cause the communication device that retransmits the HA stream, based on the marking, to transmit the HA stream at the lower latency and/or at the higher reliability than the LA stream are configured to:
cause the communication device that retransmits the HA stream based on the marked HA stream to transmit the HA stream with greater redundancy per total data sent than for the LA stream; and
cause the communication device that retransmits the HA stream based on the marked HA stream to transmit the HA stream at a retransmission rate lower than for the LA stream.

Item 66. The non-transitory, computer-readable medium of item 61, wherein the instructions configured to mark the HA stream to indicate the HA transmission are configured to:
tag or modify at least one header of at least one packet of the HA stream.

Item 67. The non-transitory, computer-readable medium of item 61, wherein the instructions configured to mark the HA stream to indicate the HA transmission are configured to:
address the HA stream to a specific port or a specific address associated with the HA transmission.

Item 68. The non-transitory, computer-readable medium of item 61, wherein the instructions configured to mark the HA stream to indicate the HA transmission are configured to:
mark the HA stream by tagging a header of the HA stream with a Differentiated Services Code Point (DSCP) precedence field or an IP precedence field.

Item 69. The non-transitory, computer-readable medium of item 61, wherein the instructions are configured to:
separately encode the HA stream and the LA stream.

Item 70. The non-transitory, computer-readable medium of item 61, wherein the instructions configured to separate the video data into the HA stream and the LA stream are configured to:
separate the video data into the HA stream and the LA stream based on a user location in an extended reality space associated with the video data.

Item 71. The non-transitory, computer-readable medium of item 61, wherein the instructions configured to separate the video data into the HA stream and the LA stream are configured to:
separate the video data into the HA stream and the LA stream based on a user movement in an extended reality space associated with the video data.

Item 72. The non-transitory, computer-readable medium of item 61, wherein the instructions configured to separate the video data into the HA stream and the LA stream are configured to:

separate the video data into the HA stream and the LA stream based on a change in play in an extended reality space associated with the video data.

Item 73. The non-transitory, computer-readable medium of item 61, wherein the instructions configured to separate the video data into the HA stream and the LA stream are configured to:
separate the video data into the HA stream and the LA stream based on a signal from a user-operated input device.

Item 74. The non-transitory, computer-readable medium of item 61, wherein the instructions configured to cause the communication device that retransmits the HA stream, based on the marking, to transmit the HA stream at the lower latency and/or at the higher reliability than the LA stream are configured to:
modulate the HA stream with a modulation coding scheme based on a port number.

Item 75. The non-transitory, computer-readable medium of item 61, wherein the instructions configured to cause the communication device that retransmits the HA stream, based on the marking, to transmit the HA stream at the lower latency and/or at the higher reliability than the LA stream are configured to:
compensate for additional transmission time by adding a resource block.

Item 76. The non-transitory, computer-readable medium of item 61, wherein the instructions configured to cause the communication device that retransmits the HA stream, based on the marking, to transmit the HA stream at the lower latency and/or at the higher reliability than the LA stream are configured to:
reduce a block error rate of the LA stream.

Item 77. The non-transitory, computer-readable medium of item 61, wherein the instructions configured to cause the communication device that retransmits the HA stream, based on the marking, to transmit the HA stream at the lower latency and/or at the higher reliability than the LA stream are configured to:
modify a transmit parameter.

Item 78. The non-transitory, computer-readable medium of item 61, wherein the instructions are configured to:
apply Wi-Fi Multimedia (WMM) to the combined stream.

Item 79. The non-transitory, computer-readable medium of item 78, wherein the instructions are configured to:
modify the WMM based on a port number.

Item 80. The non-transitory, computer-readable medium of item 61,
wherein the instructions configured to cause the communication device that retransmits the HA stream, based on the marking, to transmit the HA stream at the lower latency and/or at the higher reliability than the LA stream are configured to:
cause the communication device that retransmits the HA stream based on the marked HA stream to transmit the HA stream with greater redundancy per total data sent than for the LA stream, wherein the greater redundancy includes decreasing a coding rate for the HA stream relative to the LA stream, and wherein the coding rate is a proportion of a first portion of the HA stream that is non-redundant to a second portion of the HA stream that is redundant;
cause the communication device that retransmits the HA stream based on the marked HA stream to transmit the HA stream at a retransmission rate lower than for the LA stream;
modulate the HA stream with a modulation coding scheme based on a port number or an address associated with the HA transmission;
compensate for additional transmission time by adding a resource block; and
reduce a block error rate of the LA stream;
wherein the instructions configured to mark the HA stream to indicate the HA transmission are configured to:
tag or modify at least one header of at least one packet of the HA stream with a Differentiated Services Code Point (DSCP) precedence field or an IP precedence field; and
address the HA stream to the port number or the address associated with the HA transmission.

Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method comprising:
receiving video data;
separating the video data into a high acuity (HA) stream and a low acuity (LA) stream;
marking the HA stream to indicate HA transmission, wherein the marking the HA stream to indicate the HA transmission comprises:
tagging or modifying at least one header of at least one packet of the HA stream with a Differentiated Services Code Point (DSCP) precedence field or an Internet Protocol (IP) precedence field, and
addressing the HA stream to a port number or an address associated with the HA transmission;
causing a communication device that retransmits the HA stream, based on the marking, to transmit the HA stream at a lower latency and/or higher reliability than the LA stream, wherein the causing the communication device that retransmits the HA stream, based on the marking, to transmit the HA stream at the lower latency and/or at the higher reliability than the LA stream comprises:
causing the communication device that retransmits the HA stream based on the marked HA stream to transmit the HA stream with greater redundancy per total data sent than for the LA stream, wherein the greater redundancy includes decreasing a coding rate for the HA stream relative to the LA stream, and wherein the coding rate is a proportion of a first portion of the HA stream that is non-redundant to a second portion of the HA stream that is redundant;
causing the communication device that retransmits the HA stream based on the marked HA stream to transmit the HA stream at a retransmission rate lower than for the LA stream;
modulating the HA stream with a modulation coding scheme based on the port number or the address associated with the HA transmission;
compensating for additional transmission time by adding a resource block; and
reducing a block error rate of the LA stream;
causing a receiving device to receive the HA stream and the LA stream; and
causing a display device to generate for display a combined stream including the HA stream and the LA stream.

2. The method of claim 1, wherein the marking the HA stream to indicate the HA transmission comprises:
addressing the first portion of the video data to a specific port or a specific address associated with the HA transmission.

3. The method of claim 1, comprising:
separately encoding the first portion of the video data and the second portion of the video data.

4. The method of claim 1, wherein the separating the video data into the first portion and the second portion is based at least in part on a predictive model trained based on data characterizing usage patterns.

5. The method of claim 4, wherein the usage patterns correspond to at least one of previous processing of the video data by a requesting media device, network settings of a network communicably paired to the requesting media device, or user profile activity as accessible by the requesting media device.

6. A system comprising:
control circuitry configured to:
receive video data;
separate the video data into a high acuity (HA) stream and a low acuity (LA) stream;
mark the HA stream to indicate HA transmission, wherein the control circuitry configured to mark the HA stream to indicate the HA transmission is configured to:
tag or modify at least one header of at least one packet of the HA stream with a Differentiated Services Code Point (DSCP) precedence field or an Internet Protocol (IP) precedence field, and
address the HA stream to a port number or an address associated with the HA transmission;
cause a communication device that retransmits the HA stream, based on the marking, to transmit the HA stream at a lower latency and/or a higher reliability than the LA stream, wherein the control circuitry configured to cause the communication device that retransmits the HA stream, based on the marking, to transmit the HA stream at the lower latency and/or at the higher reliability than the LA stream is configured to:
cause the communication device that retransmits the HA stream based on the marked HA stream to transmit the HA stream with greater redundancy per total data sent than for the LA stream, wherein the greater redundancy includes decreasing a coding rate for the HA stream relative to the LA stream, and wherein the coding rate is a proportion of a first portion of the HA stream that is non-redundant to a second portion of the HA stream that is redundant;
cause the communication device that retransmits the HA stream based on the marked HA stream to transmit the HA stream at a retransmission rate lower than for the LA stream;
modulate the HA stream with a modulation coding scheme based on the port number or the address associated with the HA transmission;
compensate for additional transmission time by adding a resource block; and
reduce a block error rate of the LA stream.

7. The system of claim 6, wherein the circuitry configured to mark the HA stream to indicate the HA transmission is configured to:
address the first portion of the video data to a specific port or a specific address associated with the HA transmission.

8. The system of claim 6, wherein the circuitry is configured to:
separately encode the first of the video data and the second portion of the video data.

9. The system of claim 6, wherein circuitry configured the separate the video data into the first portion and the second portion is configured to separate the video data based at least in part on a predictive model trained based on data characterizing usage patterns.

10. The system of claim 9, wherein the usage patterns correspond to at least one of previous processing of the video data by a requesting media device, network settings of a network communicably paired to the requesting media device, or user profile activity as accessible by the requesting media device.

* * * * *